United States Patent
Barritt et al.

(10) Patent No.: US 10,805,807 B1
(45) Date of Patent: Oct. 13, 2020

(54) COORDINATION OF SPECTRUM ALLOCATION AND INTERFERENCE AVOIDANCE AMONG HIGH-ALTITUDE NETWORKS

(71) Applicant: LOON LLC, Mountain View, CA (US)

(72) Inventors: Brian Barritt, San Jose, CA (US); Daniel Holle, San Francisco, CA (US)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 16/704,022

(22) Filed: Dec. 5, 2019

(51) Int. Cl.
| | |
|---|---|
| H04W 4/00 | (2018.01) |
| H04W 16/14 | (2009.01) |
| H04W 84/06 | (2009.01) |
| H04B 7/185 | (2006.01) |
| H04M 1/725 | (2006.01) |

(52) U.S. Cl.
CPC ......... *H04W 16/14* (2013.01); *H04B 7/18513* (2013.01); *H04B 7/18528* (2013.01); *H04B 7/18563* (2013.01); *H04B 7/18565* (2013.01); *H04M 1/72519* (2013.01); *H04M 1/72522* (2013.01); *H04W 84/06* (2013.01)

(58) Field of Classification Search
CPC . H04W 16/14; H04W 84/06; H04M 1/72519; H04M 1/72522; H04M 88/02; H04B 7/18513; H04B 7/18563; H04B 7/1851; H04B 7/18515; H04B 7/18521; H04B 7/18528; H04B 7/18524
USPC ...................... 455/427, 12.1, 550.1; 707/758
See application file for complete search history.

(56) References Cited

U.S. PATENT DOCUMENTS

| | | | |
|---|---|---|---|
| 6,741,161 B1 * | 5/2004 | Kim | G08G 1/096716 340/7.1 |
| 7,809,403 B2 | 10/2010 | Chang et al. | |
| 8,312,033 B1 * | 11/2012 | McMillan | G06Q 10/10 707/758 |
| 8,373,588 B2 * | 2/2013 | Kuhn | G01S 7/022 342/176 |
| 9,866,312 B2 | 1/2018 | Jalali et al. | |
| 10,044,434 B2 * | 8/2018 | Bourrouillou | H04B 7/18563 |
| 2007/0178834 A1 * | 8/2007 | Wahlberg | H04B 7/195 455/12.1 |
| 2015/0236781 A1 | 8/2015 | Jalali | |
| 2015/0281971 A1 * | 10/2015 | Mueck | H04W 16/14 455/454 |

(Continued)

*Primary Examiner* — Danh C Le
(74) *Attorney, Agent, or Firm* — Botos Churchill IP Law LLP

(57) ABSTRACT

A multi-tenant system is provided for coordinating spectrum allocation of a plurality of high-altitude networks (HANs) so that at least one high-altitude platform (HAP) in one of the plurality of HANs is controlled to avoid interfering with a HAP in at least one other HAN of the plurality of HANs. The multi-tenant system comprises a database including: 1) a first interface, 2) a second interface, 3) at least one service module, and 4) a data storage device. The multi-tenant system further comprises a communication controller coupled to the database, the communication controller configured to control various characteristics of HAPs in their respective HANs and links therebetween based on data maintained in the data storage device of the database. The data includes regulatory and coordination constraints provided via the first interface and non-regulatory and external coordination information provided via the second interface.

20 Claims, 10 Drawing Sheets

(56) References Cited

U.S. PATENT DOCUMENTS

| | | | |
|---|---|---|---|
| 2015/0355334 A1* | 12/2015 | Stubbs | H04L 67/2852 |
| | | | 342/357.395 |
| 2016/0037434 A1* | 2/2016 | Gopal | H04L 45/02 |
| | | | 370/316 |
| 2016/0286009 A1* | 9/2016 | Edge | H04W 64/00 |
| 2016/0353241 A1* | 12/2016 | Venkataramani | H04W 40/005 |
| 2017/0006417 A1* | 1/2017 | Canoy | H04W 12/10 |
| 2018/0037241 A1* | 2/2018 | Sharma | B61L 3/008 |
| 2019/0280763 A1* | 9/2019 | Smyth | H04B 7/18517 |

* cited by examiner

100

105

200

300

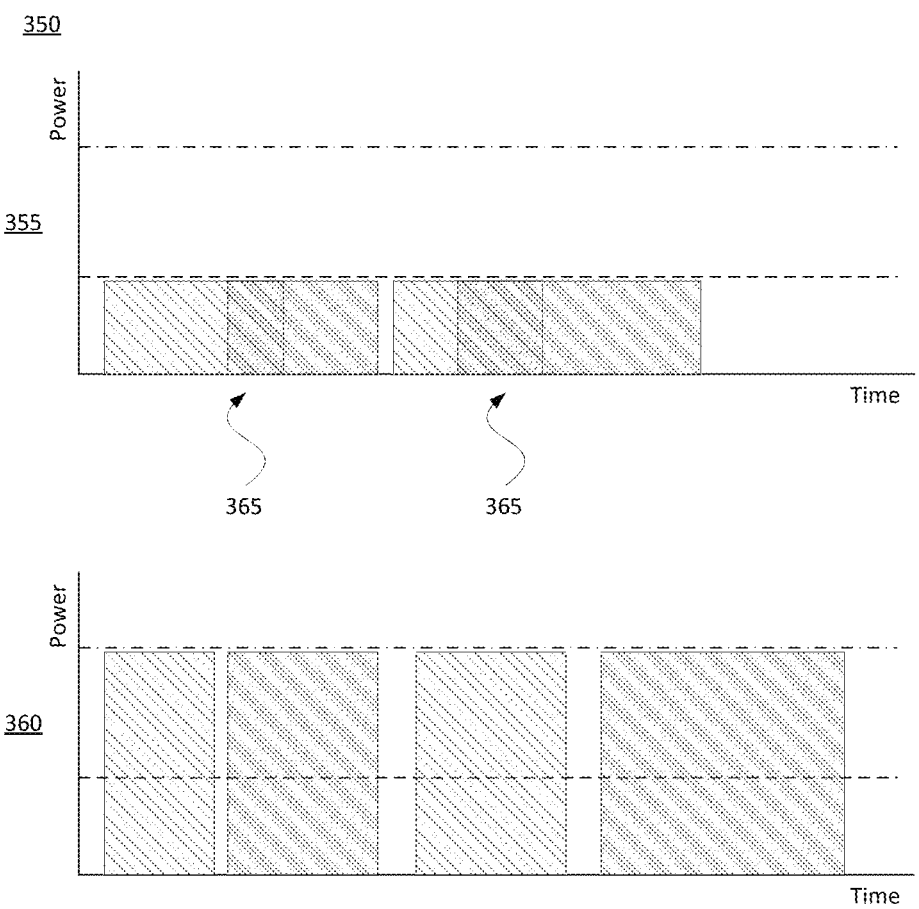

400

450

500

600

700

COORDINATION OF SPECTRUM ALLOCATION AND INTERFERENCE AVOIDANCE AMONG HIGH-ALTITUDE NETWORKS

BACKGROUND

The world sees an increased demand in data connectivity, with higher throughputs, lower latencies and availability in more geographies. Besides satellite systems, wireless networks are being created via high altitude platforms (HAPs) such as equipment-laden balloons floating in the stratosphere, high above the clouds. The balloons may communicate with each other and with ground-based networking equipment and mobile devices to connect people on the ground or other vehicles on land, at sea, or aircraft at lower altitudes. In one example, each balloon can provide connectivity to a ground area about 80 km in diameter using a wireless communications technology. Balloons may relay wireless traffic from cell phones and other devices back to the global Internet using high-speed links. HAPs, satellite systems and other communication technologies may share bandwidth due to limited spectrum availability. Interference between such systems can adversely impact connectivity and generally degrade overall performance.

BRIEF SUMMARY

Network operators may be granted rights to use some radio frequency (RF) spectrum with constraints that require them to avoid interfering with incumbent networks. Both satellite and balloon networks can be deployed to serve the increased demand in data connectivity. Balloon networks are advantageous in that they can be deployed at a much lower cost than satellites. However, it is very important that the balloon networks do not interfere with the satellite networks. As new HAPs come online, interference avoidance becomes more complicated.

Communication beams associated with these HAPs are constantly changing, whereby network traffic is regularly transmitted in licensed spectrum bands (C, Ka, Ku, etc.). Spectrum may be allocated in a static manner, where each high-altitude network (HANs) operator licenses spectrum per band, per geography and primary vs. secondary usage. The International Telecommunication Union (ITU) promulgates global guidelines, but enforcement is often executed by local agencies, such as the Federal Communications Commission (FCC), that actually grant local spectrum licenses. This is usually a static, long term process. Spectrum is a scarce and valuable resource, so its efficient use is paramount to increase usage to meet the rising demand. Also, with more dynamic HAPs that operate on a global scale, static spectrum allocation can be highly inefficient and can potentially limit the scale and impact of future HAPs.

Aspects of the technology provide for a dynamic, global and multi-tenant system to coordinate spectrum while reducing interference or avoiding interference of the allocated spectrum altogether.

As discussed further below, a temporospatial software defined network (TS-SDN) can utilize its planned (or, alternatively, its reactive, real-time) assignment of network resources and beam pointing/tasking to model the impact of interference on other (geostationary or non-geostationary) constellations (or other interference victims) and operate around interference constraints. It can even co-orchestrate multiple constellations for mutual benefit. Without the primary spectrum user sharing information about beam tasking and radio resource management, a network operator with secondary priority would have to assume a worst-case beam pointing situation. As a result, a given 3rd party network might have beams or sectors steered right at their user terminals, gateway, or satellites, and so they would have to reduce their transmit power or spectrum usage (and thus network capacity) significantly. However, with knowledge of the resource planning and beam steering of one or more primary networks, a secondary network can leverage the spatial, beamformed separation of the network resources in order to greatly increase overall network capacity. Further, if the primary and secondary networks share a common optimization engine built on top of a common TS-SDN platform, the two networks can be co-optimized in ways that cannot be achieved through the primary spectrum user simply publishing this information to the secondary spectrum user.

BRIEF DESCRIPTION OF THE DRAWINGS

FIGS. 3A and 3B show an example of blind coordination versus joint optimization for external user coordination in accordance with aspects of the technology.

DETAILED DESCRIPTION

Figure 1A:
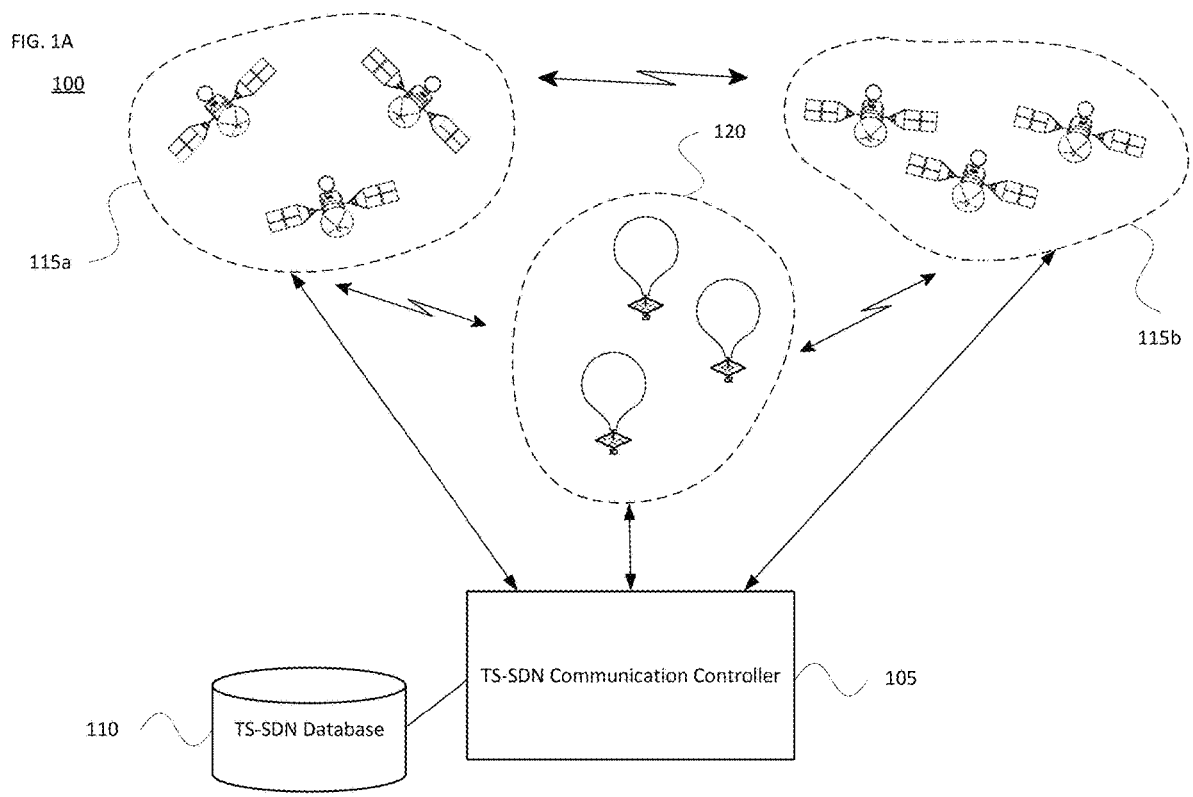
FIGS. 1A and 1B show a TS-SDN system for coordinating spectrum allocation of a plurality of HANs in accordance with aspects of the technology.

As shown in FIG. 1A, the technology relates to a TS-SDN system 100 including a TS-SDN communication controller 105 and a TS-SDN database 110. The TS-SDN system 100 coordinates communication beams of HAPs in different HANs in order to increase efficient spectrum use and to maximize throughput. The beams may be, e.g., RF or optical communication beams. For example, as shown in FIG. 1, the HANs may include satellite networks 115a and 115b, and a balloon network 120, each including one or more HAPs. Spectrum owners of balloon networks, such as the balloon network 120, have a strong interest in a central instance to enact bilateral spectrum policies, as they may be required to coordinate around the primary spectrum usage of other networks, such as satellite networks 115a and 115b. The TS-SDN system 100 may be located in one or more ground stations, one or more HAPs, or split up among both the one or more ground stations and the one or more HAPs.

Figure 1B:
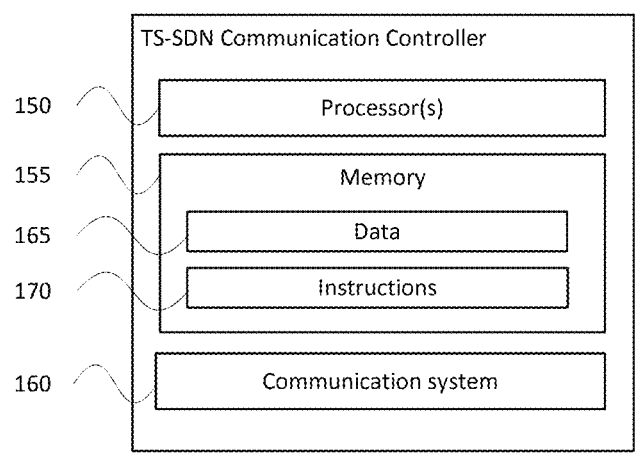

FIG. 1B is a functional diagram of the TS-SDN communication controller 105. The TS-SDN communication controller 105 may be configured to send control messages to the satellite networks 115 and/or the balloon network 120, for instance, to coordinate spectrum allocation and related operational features. As shown in FIG. 1B, the controller TS-SDN communication 105 may include one or more processors 150, a memory 155 and a communication system 160.

The processors 150 may be any conventional processors, such as commercially available computer processing units (CPUs). Alternatively, each processor may be a dedicated device such as an application-specific integrated circuit (ASIC) or other hardware-based processor such as a tensor processing unit (TPU). The memory 155 may store information accessible by the one or more processors 150, including data 165 and instructions 170 that may be executed by the processors 150. The data 165 may include a database such as the TS-SDN database 110, a table, or other storage element configured to store, e.g., spectrum allocation requirements, beam pointing directions, communication links/vectors, signal models and/or other information. The memory 155 may be of any type capable of storing information accessible by the processors 150, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 170 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions 170 may be stored in object code format for direct processing by the processor, or in any other computing device language including scripts or collections of independent source code modules that are interpreted on demand or compiled in advance. The data 165 may be retrieved, stored or modified by one or more of the processors 150 in accordance with the instructions 170.

Although FIG. 1B functionally illustrates the processors 150, the memory 150, and other elements of controller 105 as being within the same block, such devices may actually include multiple processors, computing devices, or memories that may or may not be stored within the same physical housing. Accordingly, references to a processor or computing device will be understood to include references to a collection of processors or computing devices or memories that may or may not operate in parallel.

The communication system 160 may include one or more wireless configurations to facilitate communication with other computing devices, such as the HAPs of the satellite networks 115 and the balloon network 120, as well as other devices and systems such as terrestrial communication networks. The network connections may include short or long range communication connections such as cellular connections, microwave links, free-space optical communication links, etc., as well as various configurations and communication protocols.

According to one aspect of the technology, the TS-SDN system 100 is configured to have knowledge of real time and future beam pointing. With this, spectrum use by each networks 115 and 120 can be efficiently coordinated. The beams of the HAPs may be controlled by the TS-SDN communications controller 105 to maximize spectrum usage and performance of the HAPs, such as by pinpointing capacity in a small area.

In accordance with one or more embodiments, the TS-SDN communication controller 105 of the TS-SDN system 100 is configured to determine and analyze over time all possible links (vectors) between the networks 115 and 120, whether they be between two satellite networks, between two balloon networks, between a satellite network and a balloon network, etc. Further, data regarding positions and trajectories of each balloon and satellite or other HAP of the HANs is maintained (i.e., stored) in the TS-SDN database 110 coupled to the TS-SDN communication controller 105. The TS-SDN database 110 may further include data that may be used by the TS-SDN communication controller 105 to propagate satellite orbits and various link parameters.

In addition, the TS-SDN communication controller 105 is configured to set channels, frequencies and frequency bands that exist for each transceiver in the HAPs. The TS-SDN communication controller 105 may analyze wireless signal propagation of the HAN links by modeling a wireless signal being sent out for each combination of HAP links, thus generating potentially millions of records that are stored in the database. The TS-SDN communication controller 105 may be configured to predict time intervals when each link is possible, even though sometimes curvature of the Earth may prevent such a direct determination. The database 110 may further maintain global weather data about rain and other conditions, including rainfall rate, rain cloud height, cloud data density (weather data) and the like. Depending upon the frequency bands, weather can affect the links in different ways. The database 110 may also maintain data about one or more of objects that may cause interference (e.g., aircraft and their corresponding flight data), links, channels, frequencies and time intervals.

In addition, the TS-SDN communication controller 105 may be configured to determine interference for each possible link associated with each of the HAPs based on a variety of parameters maintained by the database 110. For example, the TS-SDN database 110 may maintain a record of how much interference would affect each node in the networks and determine power flex density (e.g., measured in watts/km$^2$). The TS-SDN communication controller 105, in conjunction with the TS-SDN database 110, may be configured to predict link metrics as well as controlling network configurations to insure that interference mitigated by the balloon network does not exceed limits/thresholds established for the satellites. Interference may be designated over a volume of space, for a particular link, over an area (surface), region, country or geostationary arc of a satellite. Accordingly, the TS-SDN communication controller 105 may be configured to communicate with the HAPs of at least two different HANs in order to oversee the communications therebetween such that any links of a HAN that would violate established interference requirements would be bypassed or disconnected.

The features described herein enable interference maintenance, so as to avoid encroaching on the granted spectrum rights of other network operators when sharing the same multi-tenant instance. In a system replete with numerous nodes, having a central controller that keeps track of numerous parameters in the system allows interference to be closely monitored and controlled, even in the most complicated of systems.

Regulatory constraints and coordination constraints include consideration for both coordination with other satellite network operators, self-interference, as well as considerations for national and international regulations, such as those defined by the International Telecommunications Union (ITU).

Regulatory constraints fall under two categories: those defined by the ITU and those defined by local regulatory bodies that supersede regulations stipulated by ITU. For example, some regulatory constraints put limitations on effective isotropically radiated power (EIRP) towards the horizon, limitations on equivalent power flux density (EPFD) from a ground station to a reference receiver located within the geostationary arc, EPFD limitations from a HAP to a reference receiver located on Earth's surface, and EPFD limitations from a HAP to a reference receiver on the geostationary arc.

Each regulation effectively limits the aggregate interference in a general location of interest. Aggregate interference is applicable to all HAP system transmitters that utilize the same shared frequency channel and where transmission power from these transmitters overlaps in the regulatory area of interest. These ITU regulations must be applied uniformly to all locations within a given area of interest, whether that is the geosynchronous orbit (GSO) arc, or the Earth's surface. However, these regulations are not uniform for all frequency bands of interest. For example, there may be several frequency channels that will be available for use for either uplink or downlink communications, whereby in each of these frequency bands, there are varying levels of regulatory constraints.

Each of these regulatory constraints, even some within the same frequency channel, has varying levels of restriction, based on the maximum EPFD in a location of interest, or based on a maximum EIRP in a particular direction. The requisite channel characteristics and limitations placed on the various frequency channels of interest can be captured in a generic coordination constraints interface. For global regulations, which only consider general locations of potential victims, rather than specific victim locations, a regulation may be defined by (1) a frequency channel, (2) a location of a potential victim (e.g., a GSO arc), (3) a transmission angle (with respect to the horizon for EIRP calculations), (4) a number of HAPs in a constellation (for power flux density (PFD) calculations), and (5) a limiting factor or key performance indicator (KPI) for the coordination constraint, including one of maximum allowable EIRP, maximum allowable PFD or maximum allowable EPFD.

Beyond interference constraints, an additional constraint that may be considered for the coordination constraints interface in the TS-SDN communication controller 105 is the requirement that certain packet flows, based on the regulatory body of interest, may be required to flow only to stations in a certain geographic area, or one more stations that satisfy a given requirement (security, capability, etc.). In this case, additional interfaces should be available to the system operators to define where regulatory coverage area is for data originating or terminating at a station, and a list of acceptable stations to where these packet flows can terminate.

External coordination constraints include coordination agreements between the TS-SDN system 100 and external HANs, which may be utilizing frequency channels which overlap existing frequency bands of interest. The TS-SDN system 100 is designed with sufficient flexibility such that HAN operators can define future coordination constraints. These external coordination constraints may utilize the same KPIs as regulatory constraints. Thus, they may limit the EIRP transmitted from ground stations towards the horizon or the aggregate PFD or EPFD experienced at certain target locations. Further, limitations may be defined based on the area of interest where generated interference must be avoided and for frequency bands of interest where overlaps may occur.

In the TS-SDN system 100, the TS-SDN communication controller 105 operates in conjunction with the TS-SDN database 110, which is a persistent database of the agreed-upon coordination and regulatory constraints, such that the HAN operators can easily maintain a list of the full requirements leveraged on the system from a coordination and interference avoidance standpoint. Once the TS-SDN database 110 is updated, and the updated or new regulations are linked to applicable transmitter models, all future computations, by link evaluator, routing and topology applications, may utilize the new set of regulatory and coordination constraint requirements.

In accordance with one embodiment, the TS-SDN system 100 provides the required interfaces to define and to apply coordination and regulatory constraints to a plurality of HANs would be desirable. These regulatory constraints constitute a baseline to the full set of coordination requirements that include coordination agreements with other satellite providers that may utilize shared frequency bands. Accordingly, information required to support processing of coordination and regulatory constraints should be fully captured. For example, an interface definition for coordination constraints that will meet the requirements for both regulatory and HAP operation coordination agreements may be established such that these agreements can be fully captured in the database and can be used as inputs for an interference algorithm design for the purpose of calculating interference generated at target locations, and for computing route solutions for the network that avoid regulatory or coordination violations.

The TS-SDN system 100 may control coordination with other external operators, self-interference and regulatory management using either a single-tenant, a bifurcated multi-tenant solution or an interoperable multi-tenant solution with multiple HAP operators. In a bifurcated multi-tenant solution, the operator of a low-earth-orbit (LEO) network of satellite-type HAPs may share instance with other operators, using various networks and management systems and applications to protect confidential and proprietary information accidentally being shared between users. In an interoperable multi-tenant solution with multiple HAP operators, the operator of a LEO constellation of HAPs may share instance with other operators, but would also participate in a temporospatial spectrum usage marketplace to foster spectrum sharing and potentially tapping unused spectrum to optimize the LEO network performance.

For both single and multi-tenant (two or more operators) solutions, the regulatory and external user coordination constraints will be handled in a similar fashion, where both utilize the same generalized interface to the TS-SDN system 100 which covers all relevant KPIs and inputs to fully encapsulate the coordination information. This may be implemented by at least one remote procedure call (RPC) service, with messages encoded in a formal manner such as protocol buffers, which allows for efficient storage of all information relevant to the various constraints of interest. A list of these protocol buffers can then be populated in the TS-SDN database 110 coupled to the TS-SDN communication controller 105.

Further, a list of coordination constraints may be populated in the database with all applicable ITU regulatory constraints. A user interface (UI) coupled to at least one of the TS-SDN communication controller 105 or the TS-SDN database 110 may enable the LEO network operators, as needed, to add, change, or remove regulations from this data storage. Such regulations can be expected to change infrequently; however, the ability to maintain a current list of applicable regulations, is required to ensure that all agreed-upon regulatory and coordination constraints are honored.

For instance, while ITU regulations are not expected to change often (e.g., every few years or less), other regulations, such as those for individual countries, as well as coordination constraints, may change more rapidly (e.g., annually). By using a flexible system design that allows the LEO network operators to maintain an up-to-date list of all agreed-upon constraints in the database, the TS-SDN system 100 can be adaptable to any future changes in the regulatory or coordination environment.

Figure 2:
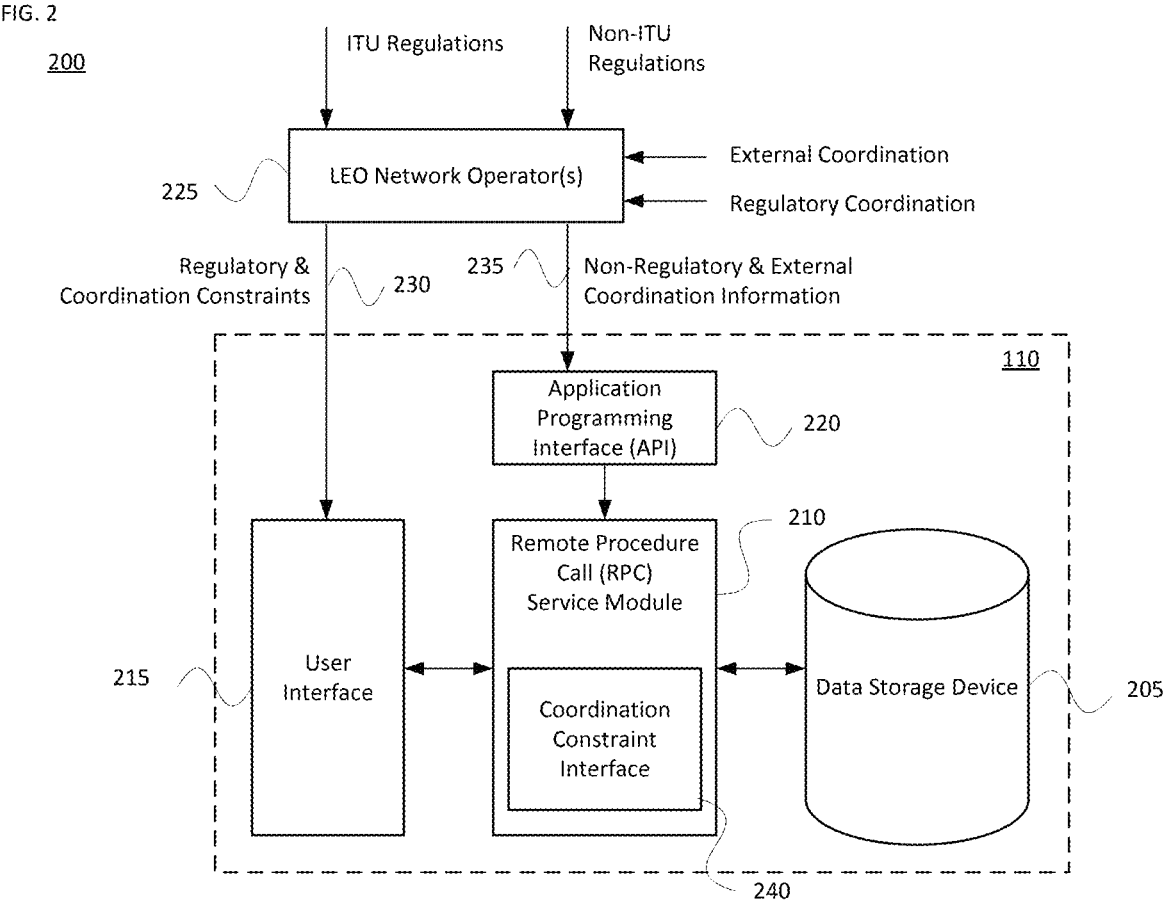
FIG. 2 shows an example of defining regulatory and coordination constraints in a database of the TS-SDN system of FIG. 1 in accordance with aspects of the technology.

FIG. 2 is an example scenario 200 illustrating regulatory and coordination constraints being populated into the TS-SDN database 110 of the TS-SDN system 100. As shown in FIG. 2, the TS-SDN database 110 may include a data storage 205, at least one RPC service module 210, a user interface (UI) 215 and an application program interface (API) 220. The UI 215 and the API 220 allow one or more LEO network operators 225 to access the data storage 205 via the RPC service module 210. The one or more LEO network operators 225 may provide regulatory and coordination constraints 230 via the UI 215 and the RPC service module 210 to maintain a current list of ITU regulatory requirements in the data storage 205. Further, the one or more LEO network operators 225 may provide non-regulatory and external coordination information 235 via the API 220 and the RPC service module 210 to maintain the non-regulatory and external coordination information 235 in the data storage 205, by updating, creating and storing interference constraints through external applications. The RPC service module 210 may include a coordination constraint interface 240.

Non-ITU constraints are related specifically to coordination constraints with external users. The first two examples are calculated on a per-link basis and aggregated to determine the full LEO network interference in a specific area, either on Earth's surface or on the GSO Arc.

The additional constraints are not necessarily related to interference, but rather limitations on routing due to local regulatory constraints and requirements. These requirements may be derived from government user requirements, or local regulatory requirements as specified by the LEO network operators 225.

Referring again to FIG. 2, by utilizing the RPC service module 210 in the TS-SDN database 110, interfaces can be provided for defining the communication platforms such as transmitters, receivers, and antennas. This information may be utilized by an interference algorithm running on the TS-SDN communication controller 105 to determine if the planned system utilization meets all defined coordination and regulatory constraint requirements.

As mentioned above, external user coordination by the TS-SDN system 100 may be performed using a single-tenant solution where each user of the TS-SDN system 100 will have a separate instance of the TS-SDN system 100, each with their own regulatory and coordination constraints defined within their instance of the TS-SDN database 110 and each with a separate instance of TS-SDN applications such as a link evaluator application.

Further, as mentioned above, external user coordination by the TS-SDN system 100 may be performed using a multi-tenant solution where a subset of information can be shared amongst users of the TS-SDN system 100. Here, when available, more specific platform and network information can be utilized by shared TS-SDN applications to jointly optimize spectrum usage between different coordinating organizations.

In addition, as mentioned above, external user coordination by the TS-SDN system 100 may be performed using an extension to the multi-tenant solution where a shared spectrum marketplace is developed that can enable organizations to trade unused or underutilized owned spectrum in a given geographic area to increase the overall spectral efficiency of each organization.

Based on these options, there are three general classes of external operators, from a coordination perspective, that must be considered. The first class are blind coordination operators. This is the model for external operator coordination where general coordination agreements can be made, indicating areas of contention and limitations to estimated interference, but the instantaneous operation of the external network (e.g. transmission schedule) is unknown. Lacking this specific information, coordination between operators will involve a blanket reduction in power based on location and frequency band. While this will likely result in improved system performance (due to reduced noise and interference from coordinated neighbors), it is non-optimal in that, when the external operators are idle in this area, increased transmission power would have little or no effect on the external operators.

With a single tenant system, this is the only method of external coordination available to the TS-SDN system 100. In a multi-tenant solution, this class of operator will be an option for coordination constraints as it is assumed that, although some operators may subscribe to the multi-tenant solution, not all networks will make their information available to be used for coordination purposes. In systems such as this, with limited information as to the location, schedule, and communication parameters of the system users, more generic coordination mechanisms will be utilized, such as blanket reductions in transmit power for frequency bands and areas of overlapping interest.

A second class of operator comprises jointly optimized coordination users. Here, organizations which utilize the TS-SDN system 100 can jointly optimize their spectrum allocation in areas of contention. Information such as platform locations, communication schedules, frequency allocations, etc., can be shared with the supporting TS-SDN applications to jointly improve the network performance of each network while protecting this information from other operators of the system.

Figure 3A:
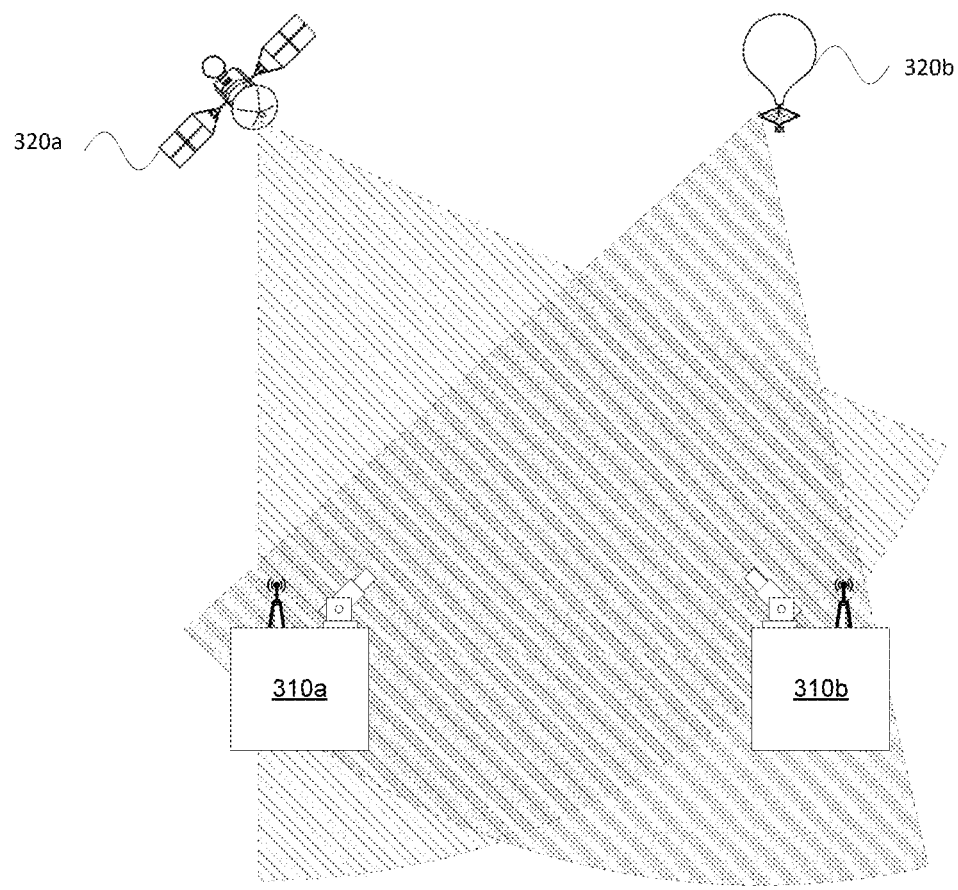

As shown in FIGS. 3A and 3B, the benefits of joint optimization can be clearly seen. Here, there is an area of contention illustrated in scenario 300 of FIG. 3A where multiple organizations are transmitting in the same general area. In this example, two ground terminals 310*a* and 310*b* are shown as being able to communicate with HAPs 320*a* and 320*b*, but this example can be extended to additional user terminals or other devices. As shown in view 350 of FIG. 3B, if the systems are unable to share scheduling and usage information, with each other or with a 3rd party application such as the TS-SDN system 100, they will perform blind coordination in this region by defining a threshold for generated interference. In particular, upper plot 355 illustrates blind coordination, and lower plot illustrates joint optimization. Here, the dash-dot line on the top of each plot indicates the system limit, while the lower dashed line indicates a limit without coordination. By reducing the transmission power available to platforms in this area, the network will see degraded performance as seen in upper plot 355. Furthermore, there will be overlapping regions 365 creating interference. For blind coordination, in terms of signal-to-noise and interference ratio (SINR), a common metric for signal quality, both the signal strength will be reduced as dictated by power limitations of the coordination agreement, and the noise will be increased, as the external operators may transmit during periods of LEO network activity. Using a multi-tenant solution where the schedules of both networks are jointly optimized as shown in the lower plot, it is possible that these transmission events can be coordinated to achieve both increased signal strength and reduced noise (interference) in areas of contention, improving the overall system performance for both networks.

There exists a third class of external operators in this scenario where a user may share information through the TS-SDN system 100 for the purposes of facilitating coordination agreements, but this organization does not subscribe to the TS-SDN system 100 for network system control. Here, more detailed information could be shared to the TS-SDN application, to perform better optimization of the LEO network performance, however, joint-optimization thru the TS-SDN applications is not possible, since direct control of the external user network is not available. The type of information exchange required with these external users and the frequency of data exchange can require more detailed analysis during the design phase of the multi-tenant solution.

In both the single and multi-tenant solutions, the TS-SDN solution may be hosted as a cloud-based service. Access to an instance of the TS-SDN service may be strictly controlled via an identity and access management (IAM) service. The IAM service enables organization administrators to manage user access to their applications and services, as well as manage shared access from other users external to the organization. Through this IAM service, administrators of the LEO network will have the ability to strictly manage access either in the single or multi-tenant solutions for coordination.

The general hierarchy of a cloud based service provides multiple organizations which utilize particular infrastructure services. Each organization can then own one or more projects. These projects are owned solely by the respective organization and not by other organizations hosted under the particular infrastructure. Finally, there are shared services which can be accessed, based on defined permissions, by the organization's project. In the simplest case, where a single-tenant solution is proposed for the TS-SDN solution, each customer of the TS-SDN service would have a separate instance under the cloud-based infrastructure.

In a purely single-tenant solution, coordination can still be managed via traditional means, where coordination agreements are made off-line and are entered into the TS-SDN database as independent of the external users. The interference algorithm and other TS-SDN applications would then calculate interference based on limited knowledge of the coordinated system, possibly leading to a solution which is sub-optimal.

In a purely multi-tenant solution, instances of the cloud-based applications, such as a link evaluator, topology applications and routing applications, would be shared between organizations. In this solution, the organization application, such as the LEO application, is still controlled solely by the owning organization. However, common applications and the database utilized by all customers of the TS-SDN system 100 can be shared based on strict access control. Here, the TS-SDN database 110 stores significant proprietary information for each customer, and access to the data objects within the TS-SDN database 110 are managed via the IAM service.

In one embodiment, a shared instance of the TS-SDN database 110 may contain information for all associated platforms of the TS-SDN system 100, either for full TS-SDN application support, or strictly for external coordination purposes. Each customer can store their own proprietary company data within their secured and access-controlled data elements within the shared database. These access control constraints may be fully configurable by the owning organization. Shared services, such as link evaluator, topology applications and routing applications, may have access to a subset of the database, in an opt-in basis, from the owning organization to perform the necessary calculations for joint coordination and regulatory compliance. The subset of data made available to the shared applications would be based on the information required to support any joint coordination agreements, in this case, between the owning organization and each respective organization.

To perform the necessary calculations for coordination, in this multi-tenant approach, sharing of specific data between organizations, while possible, is not strictly necessary. Here, a 3rd party (e.g., the TS-SDN application) perform calculations on the joint optimization problem between the two organizations based on the requirements stated in both individual and shared coordination constraints, and returns the optimized schedule and routing solution to the organization's portion of the TS-SDN data store. When developing these joint-coordination constraints, it may be beneficial to share some amount of data to determine what portions of the networks overlap and require coordination management; however, this is not different than generating these constraints under either the single or multi-tenant solutions.

In the pure multi-tenant solution, instances of the same applications, such as the Link Evaluators, are shared between organizations. This solution has multiple benefits to the organization users, such as shared non-recurring engineering (NRE) costs. However, this is potentially at the expense of organizational intellectual property. For example, if an organization were to develop an instance of the route optimization algorithm and integrate that application into the TS-SDN system for their own use, the organization may not want this algorithm to benefit other users of the system. In this case, a third solution is possible where only a subset of the applications developed are shared between the organizational users.

Coordination with external users increases the overall spectral efficiency of the licensed frequency bands. Licensed spectrum, however, is an expensive and limited resource that will become more contentious as increasingly large constellations of satellites are launched for providing network and scientific support. It is desirable that users of the spectrum could easily share underutilized or unused spectrum in certain geographic areas, such that, through these coordinated agreements, each organization can improve the performance of their respective network. For example, unused spectral white space can be shared between networks of secondary users.

To enable widespread usage of the available spectrum, the TS-SDN system 100 may be utilized as a common exchange of information, where users of the TS-SDN system 100 and other external organizations can readily exchange information on available spectrum and can facilitate external coordination agreements to enable sharing of this spectrum between organizations. This would not only improve the spectral efficiency of owned spectrum, but could enable significant improvements to the performance of the LEO network by enabling usage of previously unavailable spectrum, at the expense of spectrum that may be currently unused, or that is unused over a given geographic region. For example, the implementation of such a marketplace could be similar to the coordination agreements discussed in the previous sections, with a well-developed interface for exchanging available spectrum and coordination agreements, and having agreements brokered and enforced thru the TS-SDN system 100.

Regulatory constraints, such as those defined by the ITU, or those defined by non-ITU regulatory bodies, may be integrated into the system via the same RPC interface defined for external user coordination agreements. Here, the regulatory parameters (frequency bands of interest, locations of interest, etc.) are defined, as well as the requisite KPIs for the regulatory constraints (EIRP, EPFD, PFD, etc.) for integration into the LEO network. A LEO network operator may then integrate these regulatory constraints into the LEO network by utilizing the above-mentioned UI 215 in the TS-SDN database 110 designed for defining regulatory and coordination constraints.

In order to integrate both regulatory and coordination constraints into the TS-SDN system 100, the coordination constraint interface 240 in the RPC service module 210 shown in FIG. 2 is configured to capture the characteristics of all known regulatory and coordination constraints, capture the known KPIs associated with these regulatory and coordination constraints, and is extensible to allow for potential future growth as new regulations are identified or as new coordination agreements are adopted. For each identified regulatory or coordination constraint, a KPI and areas of applicability for the constraint are captured to ensure that the LEO network can fully comply with the coordination constraint. KPIs are the limiting factor for the constraint of interest. For all ITU regulations, these KPIs fall under EIRP limitations, PFD limitations and EPFD imitations. Additionally, non-ITU constraints may be identified with the following KPIs: 1) limitations based on a PFD mask, 2) $\Delta T/T$ limitations, 3) landing station exclusion, and 4) required landing stations.

The coordination constraint interface 240 in the RPC service module 210 has clearly identifiable values for each KPI such that the LEO network and the embedded interference algorithm can test each individual link, each end-to-end network route, or a potential set of communication links, to verify that the system as a whole is fully compliant.

The first three KPIs 1-3 are calculated based on link budget calculations for individual links, as well as aggregate interference calculations for the full LEO network on links which have overlapping physical characteristics such as frequency band.

Figure 4A:
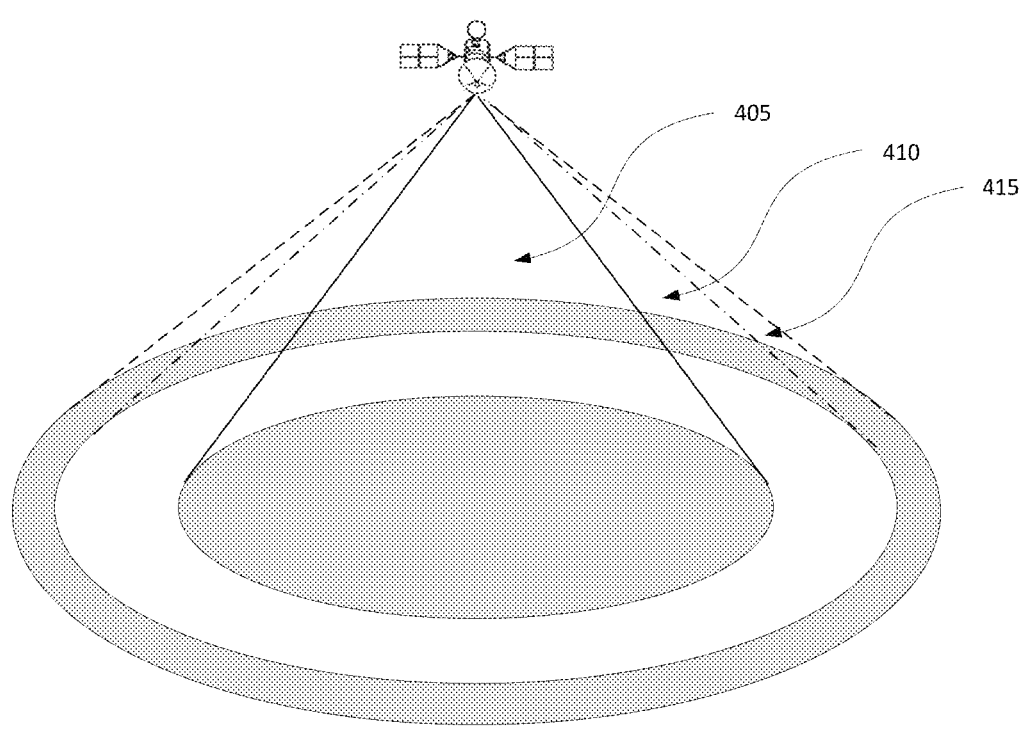
FIG. 4A illustrates example downlink PFD interference and FIG. 4B illustrates example uplink PDF interference.
Figure 4B:
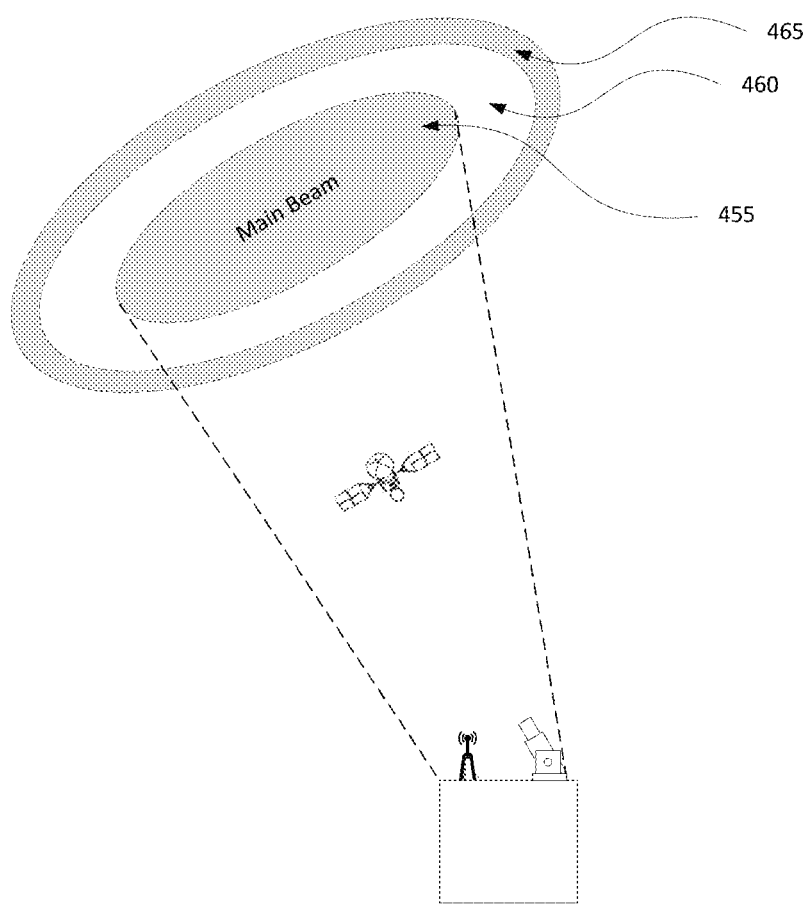

Regarding PFD limitations, there are two distinct types of ITU constraints of interest: 1) uplink PFD limitations on transmissions towards the GSO arc, and 2) downlink PFD limitations on transmissions towards Earth's surface. The computation of the PFD which is used to determine regulatory compliance is similar in both uplink and downlink interference considerations. In each case, as shown in FIGS. 4A and 4B, the interference over a large area, either the GSO arc or the surface of the Earth, leads to a solution where the target area is discretized and many parallel computations can be made for PFD contribution in a specific location. For instance, as shown in example 400 of FIG. 4A, the HAP (e.g., satellite as shown) may transmit with a main lobe signal that falls within region 405 (between the solid lines). It may also have one or more sidelobes 410 (between the solid lines and dash-dot lines) and 415 (between the dash-dot lines and outer dashed lines). Further, FIG. 4B illustrates a projection for the main beam 455 (and other beams 460, 465) from a ground station transmitting to the HAP (e.g., satellite as shown).

PFD mask computation covers both interference estimation for coordination agreements as well as ensuring ITU regulatory compliance. For PFD analysis, the three major design options are of initial interest: 1) full precomputation of PFD masks, 2) full reactive computation of PFD masks, and 3) hybrid approach with partial precomputation with on-demand refinement. For ITU regulatory interference, a PFD mask may be generated to limit generated interference over all areas on Earth's surface of the GSO arc that are within line of sight to the offending transmitter. For external coordination constraints, a similar PFD mask will be generated, only at a significantly smaller scale and ideally can be combined into a single PFD mask for the system.

Figure 5:
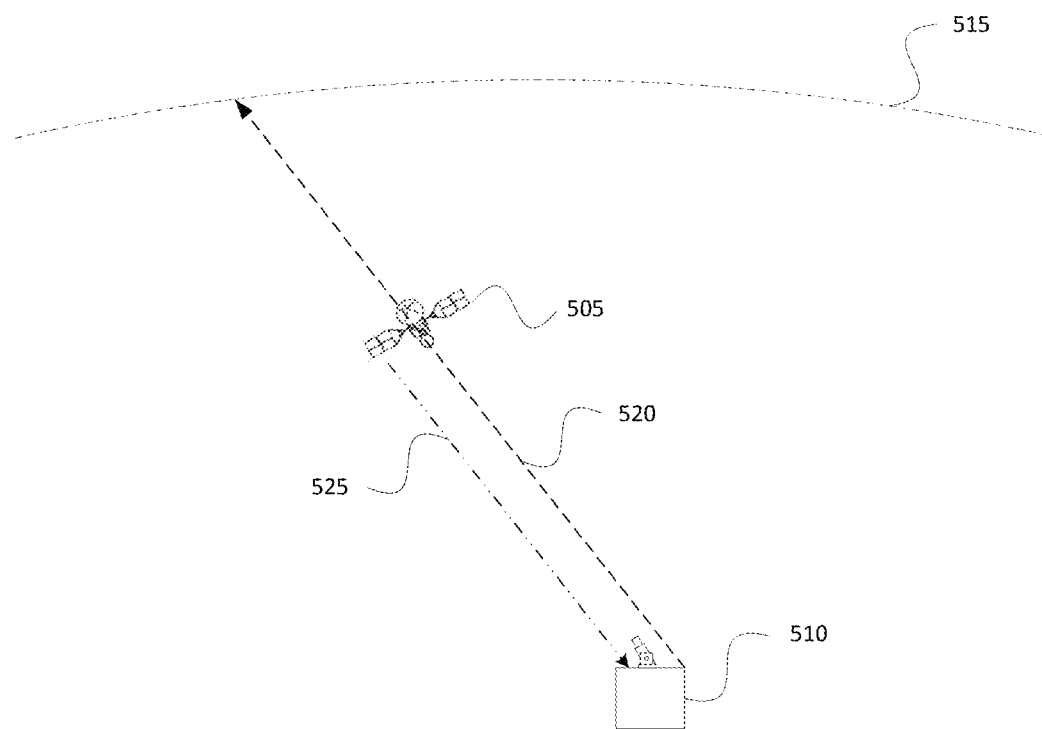
FIG. 5 illustrates an example for performing PFD estimation for uplink and downlink considerations in accordance with aspects of the technology.

The representation 500 of FIG. 5 illustrates a method for performing PFD estimation for uplink and downlink considerations. As a LEO HAP 505 comes over the horizon, the computed PFD rate of change increases as a function of the range rate between the LEO HAP 505 and a location of reference (i.e., target) ground terminal 510. This is, a non-linear relationship as the computed PFD is based on the square of the distance between a transmitter and a target receiver. FIG. 5 further illustrates a GSO orbital altitude 515, the uplink PFD computation 520, and the downlink PFD computation 525. As the LEO HAP 505 comes directly overhead, the PFD rate of change decreases dramatically as the relative range rate decreases at the center of the pass. As expected, the lower altitude flight has the worst case PFD rate of change as the LEO HAP 505 is moving much faster relative to the ground station 510 due to its lower orbital path. Similarly, as expected, the rate of change for uplink PFD is much lower than that of the downlink due to the significantly larger distances to the GSO arc, resulting in a lower range rate of change.

In accordance with one embodiment, computation of direct and interference link budgets are combined into a single uniform self-interference computation, rather than pre-computing all possible link combinations for each interference link report. Self-interference involved computing specific link budgets such that a carrier (C) to a noise (N) plus interference (N+I) ratio can be properly estimated and the expected throughput of a given link can be properly sized. Link budgets may be calculated based on: 1) transmit power, 2) transmit antenna gain, 3) the combined propagation losses including, but not limited to, free space attenuation, atmospheric attenuation, scintillation loss, rain fading and weather effects, 4) receive antenna gain and 5) power at the receiver.

In accordance with another embodiment, self-interference analysis may be produced at scale by combining co-located user terminals into a single reference link computation for an interference pre-calculation. Here, rather than calculating link budgets for millions user terminals in the full LEO network, link budgets are precomputed to appropriately sized and located cells as a reference link budget.

In accordance with another embodiment, PFD masks may be determined to satisfy both ITU regulatory constraints and external coordination agreements. A PFD mask will specify, for a given location either on Earth, on the GSO arc, or on some non-GSO (NGSO) orbital location (for external coordination constraints) the maximum allowable PFD generated by that transmitter. Algorithmic approaches are provided for computing the PFD contributions of a LEO transmitter over a large geographic area, at scale.

Proactive computation of the PFD for each LEO transmission source is a brute-force mechanism for ensuring ITU regulatory and external coordination compliance. In this method, all possible communication links in the system are considered within the link evaluator applications, prior to any optimization by the TS-SDN communication controller.

The benefits of this approach is that the TS-SDN communication controller, when searching the vast solution space for an optimized network routing and scheduling solution, will have all information immediately available for a given solution. This allows the TS-SDN communication controller to quickly look at proposed solutions and determine the feasibility based on whether or not the selected links in that solution violate any predefined regulatory or coordination constraints.

Figure 6:
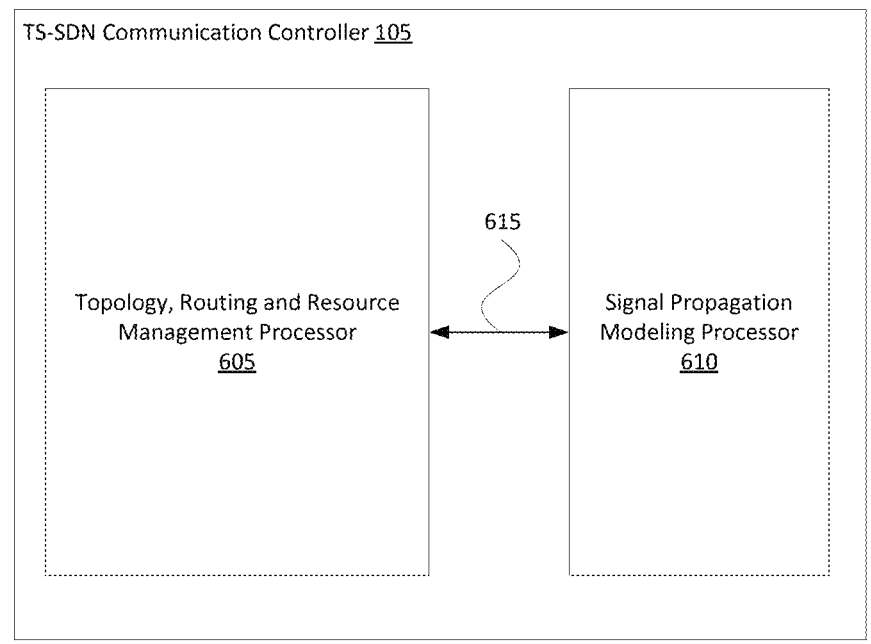
FIG. 6 shows a topology, routing resource management processor and a signal propagation modeling processor in the TS-SDN system of FIG. 1, in accordance with aspects of the technology.

FIG. 6 illustrates a view 600 showing that the TS-SDN communication controller 105 may include a plurality of processors. For instance, it may include both a topology, routing and resource management processor 605 and a signal propagation modeling processor 610 that communicate with each other over a bi-directional link 615. A related application may independent run on each respective one of these processors 605 and 610. The processors may be of any type described above.

Figure 7:
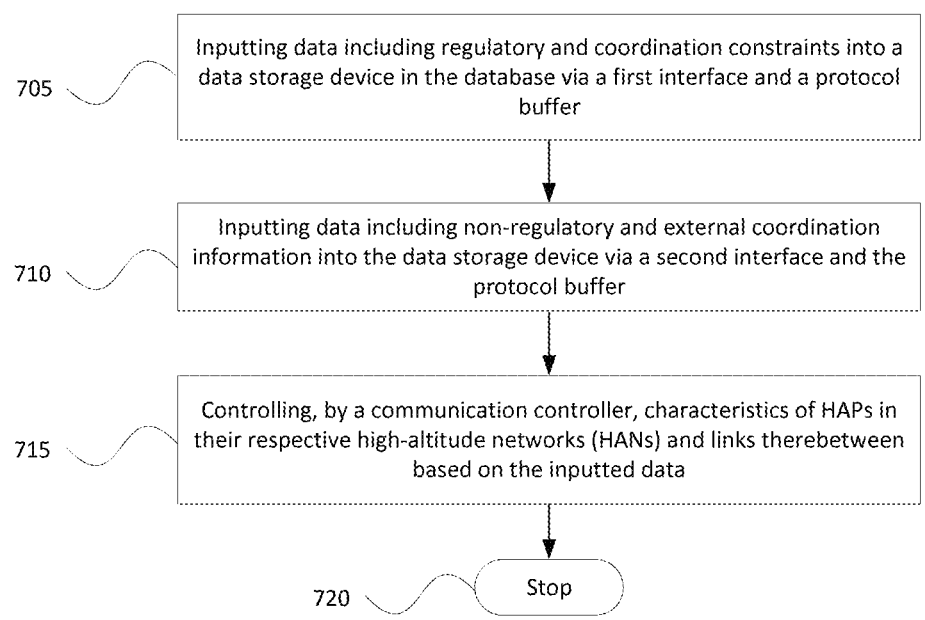
FIG. 7 is a flow diagram in accordance with aspects of the technology.

FIG. 7 is a flow diagram of a method 700 for populating data in a database in a multi-tenant system for coordinating spectrum allocation of a plurality of HANs so that at least one HAP in one of the plurality of HANs is controlled to avoid interfering with a HAP in at least one other HAN of the plurality of HANs. Referring to FIGS. 1 and 2, at block 705 data including regulatory and coordination constraints is inputted into the data storage device 205 in the database 110 via a first interface (UI 215) and an RPC service module 210. At block 710, data including non-regulatory and external coordination information is inputted into the data storage device 205 via a second interface (API 220) and the RPC service module 210. Then, at block 715, a communication controller (e.g., TS-SDN communication controller 105) controls various characteristics of HAPs in their respective HANs and links therebetween based on the inputted data. The process stops at block 720. Alternatively, the control process may continue as new or updated information is entered into the system.

Under the assumption that there is a total of NxM links possible within the LEO network, where N is the number of ground terminals and M is the number of HAPs, not all of the M HAPs will be within line of sight at one time. Therefore, only a subset of these links, for a given time instance, will have associated PFD masks calculated. Using a modeling application, an aggregate, world-wide coverage analysis of those satellites which are within line of sight to a given ground terminal can be determined.

PFDs of possible links many be reactively computed based on input from the signal propagation modeling processor 610. In the worst case scenario where all possible combinations of communications links are considered, many PFD computations may be performed on links which are not utilized or possibly not even considered as the signal propagation modeling processor 610 searches for an optimized solution. This solution presents a trade-off between computational requirements of proactive computation and the processor latency added to the system by introducing reactive solving as part of the link evaluation processor's optimization loop. For each requested communication link PFD mask, the number of computations may be computed for that link. Here, the reduction in computational efficiency only comes from reducing the number of considered communications links to those being investigated by the signal propagation modeling processor 610, rather than all possible communication links in the LEO network.

The worst case numbers presented above base the temporal resolution of the PFD computations on the worst case PFD rate of change. This greatly simplifies the PFD algorithm implementation as a static number can be set throughout the system, but this comes at a cost. The PFD rate for a worst case scenario of a low altitude satellite may pass directly over a target of interest. Thus, the PFD rate changes considerably across the satellite pass. This change in PFD rate is largely influenced by the range rate of the satellite pass which changes dramatically as the satellite comes over the horizon, but reduces to zero as the satellite passes directly overhead. The time steps of the PFD computation may dynamically adjusted based on the estimated satellite range rate and expected PFD rate of change.

By spatially aggregating link evaluations to adjacent LEO user terminals, the amount of required PFD computations can be significantly reduced. For downlink PFD computation, it is important to measure the PFD contribution across the entire Earth's surface as the location and number of potential victim receivers is unknown. This information, however, is available for uplink PFD computation where the interference victims are high priority HAPs which are registered with the ITU. In this case, rather than computing PFD interference contributions across the entire GSO arc, the HAP constellations can be directly modeled and specific PFD or EPFD calculations can be made to each of the HAP's projected location.

While KPIs associated with regulatory constraints are expected to change infrequently, the TS-SDN system 100 may adapt to these changes when they come. Similarly, coordination constraints may not be well defined. As additional coordination agreements are made, KPIs for these agreements may come in different, unknown forms. Using the solutions provided by the TS-SDN system 100, updating the interference constraints data structures is a simple matter.

Coordination applicability enables the LEO network operators to identify, for each defined coordination constraint, whether a potential link or set of links is constrained by the coordination constraint. Based on ITU regulations and interaction with the regulatory experts, the following coordination constraints may include one or more of the following: 1) frequency range, type of terminal (LEO HAP, landing station and user terminal), 3) geographic area (national border, predefined geographic area(s) on Earth, specific location(s) on Earth, specific ephemeris for HAP, geosynchronous arc), 4) elevation mask (minimum elevation angle and predefined 3D elevation mask), and 5) user type.

When analyzing the system as a whole, for each link or set of links, all of these coordination characteristics may first be analyzed to determine the subset of coordination constraints to which this link applies. This can involve determining 1) whether the landing station and/or user terminal is within the geographic area of interest, 2) whether the terminal type and air interface protocols match the constraint, 3) whether the transmit power is focused in a direction near the limiting area, 4) whether the transmitter is in a frequency band of interest and, 5) whether the elevation angle for ground terminals is within the stipulations or the associated regulations.

In order to validate that a coordination constraint applies to a given communication link, a certain amount of information may be required concerning the transmitting station, such as maximum transmission power, antenna gain pattern, center frequency bandwidth, and/or location on Earth for ground stations.

Based on this information, many of the coordination constraints can be eliminated to avoid unnecessary computation. For regulations that require regulatory bodies of interest, the nation in which the ground station (landing station or user terminal) is located may be required. Thus, a database resolving geographic location to a country may be employed. This may be part of or external to the TS-SDN database.

In order to efficiently integrate coordination constraints into the TS-SDN system 100, the coordination constraints are defined in a way that is flexible. Thus, constraints can be added and removed as needed by LEO network operators. The coordination constraints are also defined in a way that is extensible. Thus, as additional constraints are added, if they do not conform to the exact characteristics defined in the available interface, those interfaces can be modified accordingly.

The features described herein may provide for a multi-tenant system is provided for coordinating spectrum allocation of a plurality of HANs so that at least one HAP in one of the plurality of HANs is controlled to avoid interfering with a HAP in at least one other HAN of the plurality of HANs. The multi-tenant system comprises a database including: 1) a first interface, 2) a second interface, 3) at least one service, and 4) a data storage device. The multi-tenant system further comprises a communication controller coupled to the database, the communication controller configured to control various characteristics of HAPs in their respective HANs and links therebetween based on data maintained in the data storage device of the database. The data includes regulatory and coordination constraints provided via the first interface and non-regulatory and external coordination information provided via the second interface.

Unless otherwise stated, the foregoing examples and embodiments are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A multi-tenant system for coordinating spectrum allocation of a plurality of high-altitude networks (HANs) so that at least one high-altitude platform (HAP) in a first one of the plurality of HANs is controlled to avoid interfering with a HAP in at least a second one of the plurality of HANs, the multi-tenant system comprising:
a database including:
a first interface configured to receive regulatory and coordination constraints,
a second interface configured to receive non-regulatory and external coordination information,
at least one service module configured to receive the regulatory and coordination constraints from the first interface and the non-regulatory and external coordination information from the second interface, and
a data storage device configured to store data received from the at least one service module; and
a communication controller coupled to the database, the communication controller configured to control characteristics of HAPs in their respective HANs and links therebetween based on the data maintained in the data storage device of the database,
wherein the data includes the regulatory and coordination constraints that are provided to the data storage device via the first interface and the at least one service module, and the non-regulatory and external coordination information that is provided to the data storage device via the second interface and the at least one service module.

2. The multi-tenant system of claim 1, wherein the first HAN is a balloon network and the second HAN is a satellite network.

3. The multi-tenant system of claim 1, wherein the first HAN and the second HAN are satellite networks.

4. The multi-tenant system of claim 1, wherein the first interface is a user interface (UI) and the second interface is an application program interface (API).

5. The multi-tenant system of claim 1, wherein the data includes information on communication channels, frequency bands and interference limits for at least one of the first and second HANs.

6. The multi-tenant system of claim 1, wherein the communication controller is configured to perform power flux density (PFD) calculations for uplink and downlink communication for at least one of the first and second HANs.

7. The multi-tenant system of claim 1, wherein the data includes satellite trajectory information for at least one of the first and second HANs.

8. The multi-tenant system of claim 1, wherein the communication controller is a temporospatial software defined network (TS-SDN) communication controller.

9. The multi-tenant system of claim 8, wherein TS-SDN service provided by the multi-tenant system is controlled via an identity and access management (IAM) service configured to enable organization administrators to manage user access to their applications and services, and to enable the organization administrators to manage shared access from other users external to the multi-tenant system.

10. The multi-tenant system of claim 1, wherein the communication controller comprises a topology, routing and resource management processor and a signal propagation modeling processor, the topology, routing and resource management processor being configured for bidirectional communication with the signal propagation modeling processor.

11. The multi-tenant system of claim 1, wherein the at least one service module includes a coordination constraint interface configured to: 1) capture the characteristics of known regulatory and coordination constraints, and 2) capture known key performance indicators (KPIs) associated with the regulatory and coordination constraints.

12. The multi-tenant system of claim 11, wherein the coordination constraint interface is extensible to enable future growth as new regulations are identified or as new coordination agreements are adopted.

13. A method for populating data in a database in a multi-tenant system for coordinating spectrum allocation of a plurality of high-altitude networks (HANs) so that at least one high-altitude platform (HAP) in a first one of the plurality of HANs is controlled to avoid interfering with a HAP in a second one of the plurality of HANs, the method comprising:
inputting a first set of data including regulatory and coordination constraints into a data storage device in the database via a first interface and at least one service module;
inputting a second set of data including non-regulatory and external coordination information into the data storage device via a second interface and the at least one service module, the second interface being separate from the first interface; and controlling, by a communication controller, characteristics of HAPs in at least one of the first and second HANs and links therebetween based on the inputted first and second sets of data.

14. The method of claim 13, wherein first HAN is a balloon network and the second HAN is a satellite network.

15. The method of claim 13, wherein the first HAN and the second HAN are satellite networks.

16. The method of claim 13, wherein one or both of the first set of data and the second set of data includes satellite trajectory information for at least one of the first and second HANs.

17. The method of claim 13, further comprising:
controlling, by an identity and access management (IAM) service, a temporospatial software defined network (TS-SDN) service provided by the multi-tenant system, the TS-SDN service enabling organization administrators to manage user access to their applications and services and to manage shared access from other users external to the multi-tenant system.

18. The method of claim 13, further comprising capturing the characteristics of known regulatory and coordination constraints.

19. The method of claim 18 further comprising capturing known key performance indicators (KPIs) associated with the regulatory and coordination constraints.

20. The method of claim 13, further comprising performing power flux density (PFD) calculations for uplink and downlink communication for at least one of the first and second HANs.

\* \* \* \* \*